United States Patent
Olariu et al.

(10) Patent No.: US 7,952,996 B2
(45) Date of Patent: May 31, 2011

(54) METHOD AND APPARATUS FOR ASSESSING TRAFFIC LOAD OF A COMMUNICATION NETWORK

(75) Inventors: Gabriel L. Olariu, Germantown, MD (US); Roderick Ragland, Rockville, MD (US); Frank Kelly, Walkersville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1298 days.

(21) Appl. No.: 11/085,994

(22) Filed: Mar. 22, 2005

(65) Prior Publication Data
US 2006/0072453 A1 Apr. 6, 2006

Related U.S. Application Data

(60) Provisional application No. 60/615,903, filed on Oct. 5, 2004.

(51) Int. Cl.
*H04L 12/26* (2006.01)

(52) U.S. Cl. .......................... 370/229; 370/230; 370/235

(58) Field of Classification Search .................. 370/229, 370/232–234, 230, 230.1, 231, 235, 464, 370/465, 468, 477, 316; 709/223, 226, 232, 709/234, 235; 455/3.01, 3.02, 3.05, 13.1, 455/13.2, 91, 103
See application file for complete search history.

(56) References Cited

U.S. PATENT DOCUMENTS

| | | | | |
|---|---|---|---|---|
| 7,085,247 B2 * | 8/2006 | Schweinhart et al. | ........ | 370/316 |
| 7,130,283 B2 * | 10/2006 | Vogel et al. | .................... | 370/322 |
| 2001/0048670 A1 * | 12/2001 | Kelly et al. | .................... | 370/316 |
| 2003/0032427 A1 * | 2/2003 | Walsh et al. | .................. | 455/428 |
| 2003/0142692 A1 * | 7/2003 | Shimada | ...................... | 370/442 |
| 2003/0154272 A1 * | 8/2003 | Dillon et al. | .................. | 709/223 |
| 2004/0165528 A1 * | 8/2004 | Li et al. | ........................ | 370/230 |
| 2005/0054288 A1 * | 3/2005 | Agarwal | ..................... | 455/13.1 |

FOREIGN PATENT DOCUMENTS

GB 2396524 A * 12/2002

* cited by examiner

*Primary Examiner* — Albert T Chou
(74) *Attorney, Agent, or Firm* — K&L Gates LLP

(57) ABSTRACT

An approach is provided for obtaining load of a terminal operating in a communication system. A query is transmitted for a cumulative load of the terminal, wherein the terminal belongs to a group of terminals having a common service level. The cumulative load for the terminal is determined based on load information supplied by the terminal and bandwidth allocation information, wherein the cumulative load represents a total amount of data sent over a communication channel of the communication system. The determined cumulative load is provided in response to the query. This arrangement has particular applicability to a satellite network that provides data communication services.

14 Claims, 8 Drawing Sheets

METHOD AND APPARATUS FOR ASSESSING TRAFFIC LOAD OF A COMMUNICATION NETWORK

RELATED APPLICATIONS

This application is related to, and claims the benefit of the earlier filing date under 35 U.S.C. §119(e) of, U.S. Provisional Patent Application (Ser. No. 60/615,903) filed Oct. 5, 2004, entitled "Cumulative Backlog—Method for Assessing the Traffic Load in a Communication Network"; the entirety of which is incorporated herein by reference.

FIELD OF THE INVENTION

The present invention relates to communication systems, and more particularly to determining network load.

BACKGROUND OF THE INVENTION

Communication service providers, from cable to cellular to satellite providers, are ever mindful of the performance and availability of their networks. One key aspect for ensuring high performance and high availability concerns how traffic is engineered. For instance, if certain communication circuits or channels are constantly over-loaded, while others are underutilized, the service provider incurs great costs. That is, because some circuits are oversubscribed, users assigned to these circuits will not have service, and yet, the system does have circuits that are hardly employed, resulting in wasted capacity. Further, this in effect unfairly blocks certain subscribers from obtaining network capacity. Consequently, to ensure capacity is allocated properly, network traffic load has to be determined accurately and in a manner that does not introduce significant cost to the network service provider. Additionally, from an auditing standpoint, subscribers to services of a communication system may need information on the amount of traffic that they actually originate for transmission over the transport network to avoid being overcharged.

The cost can stem from actual cost in developing and deploying new hardware and software to accommodate needed traffic load information. Unfortunately, many conventional communication systems are bound by legacy platforms and protocols, such that a "forklift" implementation approach is cost prohibitive. As a result, any contemplated modification to software and protocols can exact a tremendous cost to the system, whereby benefits from the new protocols are overshadowed by the heavy cost. Moreover, it is recognized that many communication systems employ protocols that follow a standard, whether actual or de facto, wherein the modifications can result in non-compliance with the standard.

Based on the foregoing, there is a clear need for improved approaches for assessing traffic load, while minimizing costs.

SUMMARY OF THE INVENTION

These and other needs are addressed by the present invention, wherein an approach is provided for determining cumulative load of a terminal.

According to one aspect of the present invention, a method for determining load of a terminal operating in a communication system is disclosed. The method includes receiving load information from the terminal during a frame transmission, wherein the terminal belongs to a group of terminals having a common service level. Additionally, the method includes determining bandwidth allocation information associated with the frame transmission. Further, the method includes determining a cumulative load for the terminal based on the load information and the bandwidth allocation information, wherein the cumulative load represents a total amount of data sent over a communication channel of the communication system.

According to another aspect of the present invention, an apparatus for determining load of a terminal operating in a communication system is disclosed. The apparatus includes a processing module configured to receive load information from the terminal during a frame transmission, wherein the terminal belongs to a group of terminals having a common service level. The processing module is further configured to determine bandwidth allocation information associated with the frame transmission. The processing module is further configured to determine a cumulative load for the terminal based on the load information and the bandwidth allocation information, wherein the cumulative load represents a total amount of data sent over a communication channel of the communication system.

According to yet another aspect of the present invention, a method for obtaining load of a terminal operating in a communication system is disclosed. The method includes transmitting a query for a cumulative load of the terminal, wherein the terminal belongs to a group of terminals having a common service level. Also, the method includes determining a cumulative load for the terminal based on load information supplied by the terminal and bandwidth allocation information, wherein the cumulative load represents a total amount of data sent over a communication channel of the communication system. The method further includes providing the determined cumulative load in response to the query.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, apparatus, and software for assessing traffic load in a communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention, according to one embodiment, introduces a technique of approximating the traffic load in a system with a central hub and a network of terminals. The approach can be used at the hub to determine an optimal resource (bandwidth) allocation policy. The approach for approximation of traffic load provides an indispensable tool in the process of allocating a limited amount of bandwidth in a demand based, quality of service driven system. This approach prevents bandwidth waste and drives the bandwidth allocation processes to adhere to the predefined, guaranteed levels of service.

Although the present invention is discussed with respect to a satellite communication system, it is recognized by one of ordinary skill in the art that the present invention has applicability to any type of transport network, such as an xDSL (Digital Subscriber Line) system or a cable network with a return channel.

Figure 1:
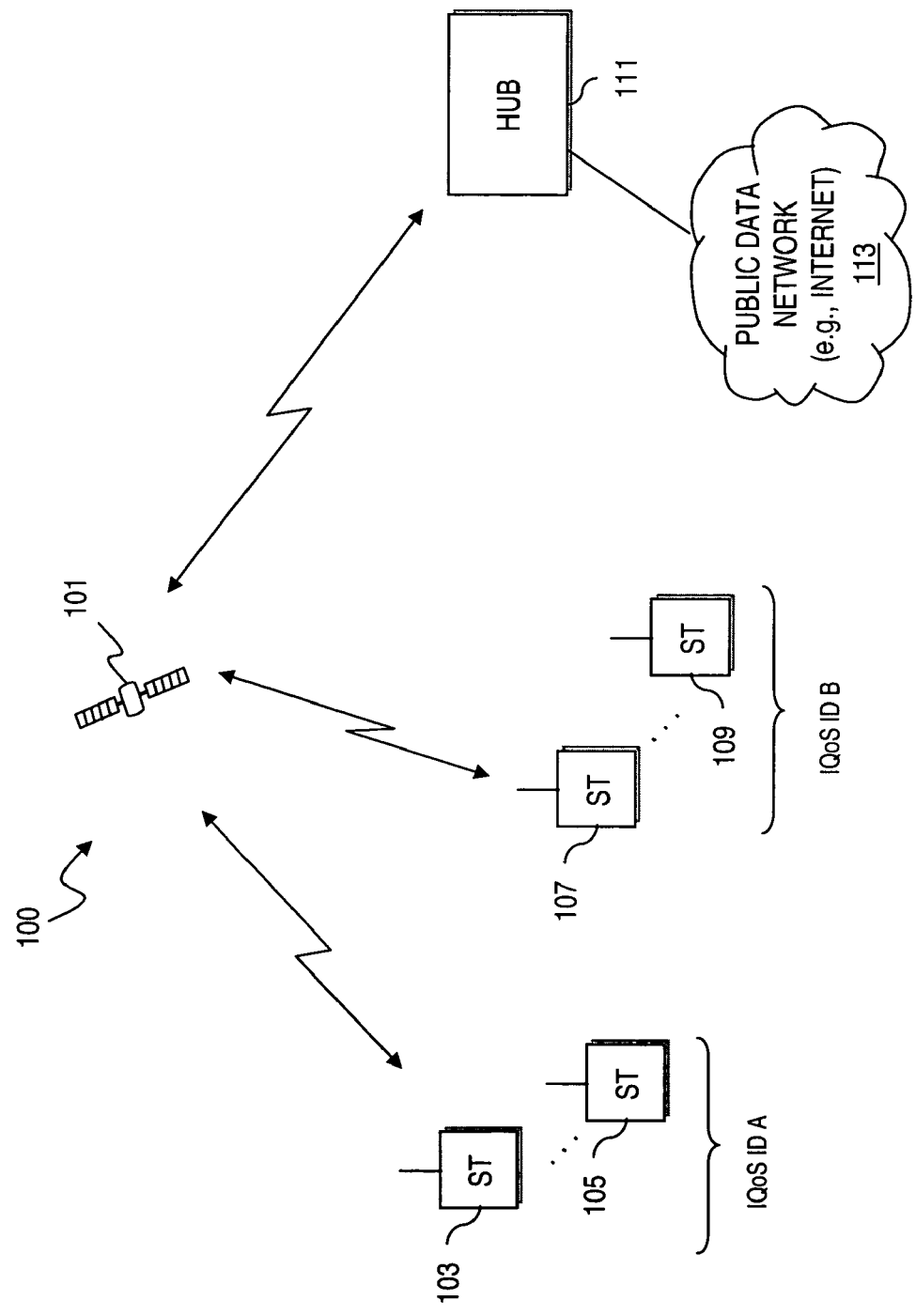
FIG. 1 is a diagram of a communication system capable of determining cumulative traffic load of the terminals, according to an embodiment of the present invention.

FIG. 1 is a diagram of a communication system capable of determining cumulative traffic load of the terminals, according to an embodiment of the present invention. A satellite communication system 100 utilizes a satellite 101 to transmit information, bi-directionally, to and from satellite terminals (STs) 103, 105, 107, 109 and a hub 111. In an exemplary embodiment, the STs 103, 105, 107, 109 are Very Small Aperture Terminals (VSAT), and can provide access to a public data network 113, such as the Internet. The hub 111 operates as part of a Network Operations Center (NOC). According to one embodiment of the present invention, the hub 111 receives load (or backlog) information from the STs 103, 105, 107, 109, as more fully described with respect to FIG. 3.

Typically, the various STs 103, 105, 107, 109 are associated with different subscribers. By way of example, STs 103 and 105 are under control of Enterprise A, while STs 107 and 109 belong to Enterprise B. In the system 100, the STs 103, 105, 107, 109 originate traffic from a particular coverage area and may exchange data among themselves as well as other STs (not shown). Each of the terminals 103, 105, 107, 109 uses a contention channel to request bandwidth from the NOC 111, and thereafter transmits data over a collision free (stream) channel. At various points in time, each of the STs 103, 105, 107, 109 has data awaiting transmission; this data is considered the user load. At any given time, the STs 103, 105, 107, 109 can use a single stream channel. A channel load can be defined as a normalized sum of the individual user load.

Figure 2:
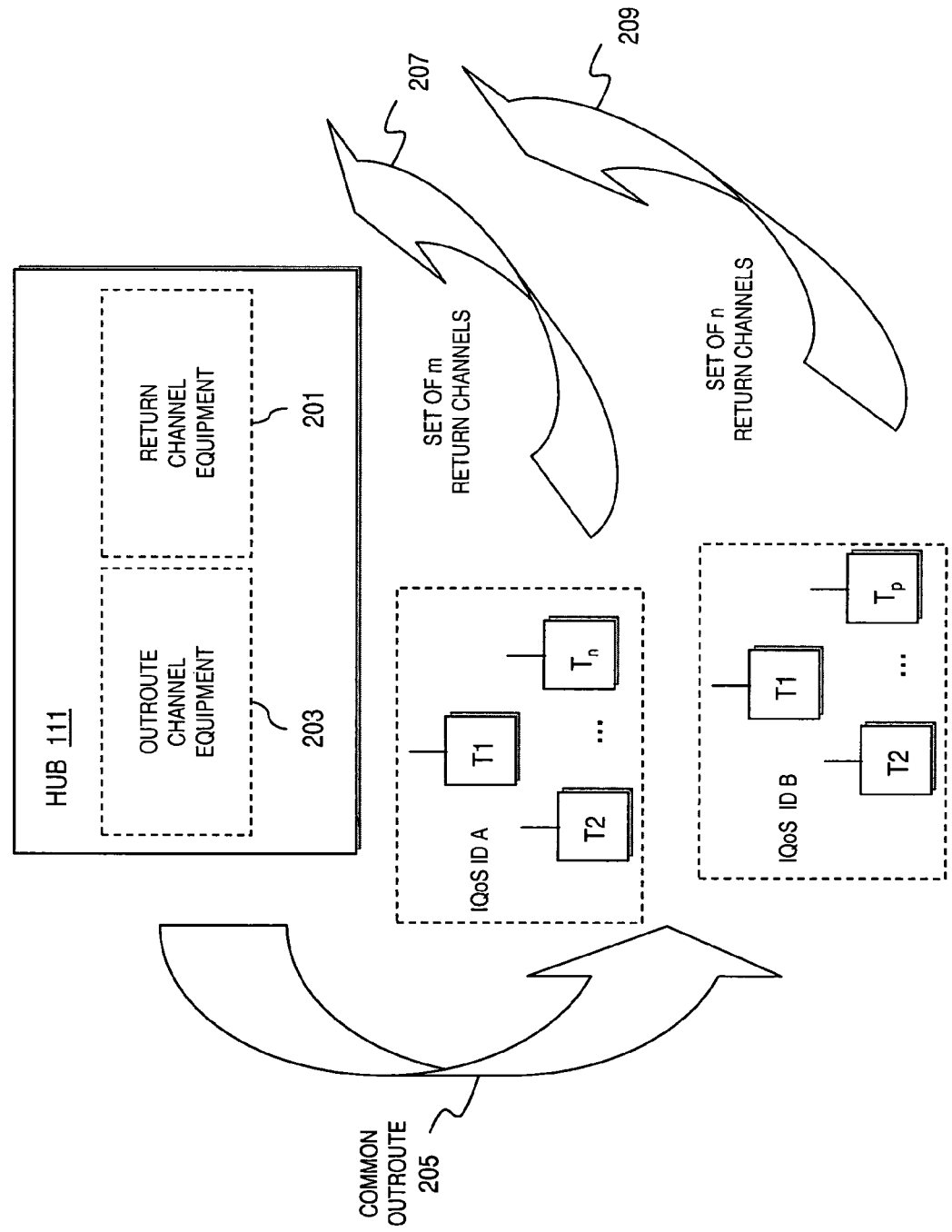
FIG. 2 is a diagram of an architecture of the hub in FIG. 1 for mapping return channel bandwidth to the terminals, according to an embodiment of the present invention.

According to one embodiment of the present invention, each subset of terminals 103, 105, 107, 109, is issued a unique Inroute Quality of Service Identifier (IQoS ID) as part of a service level agreement. Such an ID is configured in all the terminals that are commissioned, as well as in some of the equipment in the hub 111, e.g., return channel equipment (as shown in FIG. 2). Because each enterprise is likely to require the same quality of service level throughout the enterprise, the STs 103, 105 are assigned an IQoS ID A, and the STs 107, 109 are given an IQoS ID B. Return channel bandwidth is dynamically mapped to customer terminals through, in an exemplary embodiment, messages sent from the hub 111 on the outroute. As used herein, "return channel", "inroute", and "uplink channel" are synonymously used to denote a communication channel established via the satellite 101 to transport data in the direction from the STs 103, 105 to the satellite 101 or the hub 111. The terms "receive channel", "outroute" and "downlink channel" refer to a communication channel carrying traffic in the direction from the satellite 101 or the hub 111 to the STs 103, 105.

At commissioning, the STs 103, 105, 107, 109 are configured with a set of parameters (which include the IQoS ID) required to access the resource. The hub 111 is responsible for allocating inroute bandwidth, and can do so without any knowledge of the identity of the users that are capable of using the system's resources. This capability enhances scalability in the system 100. Also, the system 100 is secured against unauthorized use through advanced encryption methods, as explained below.

Additionally, the system 100 can allow for continuous utilization of the network inroute resources (inroutes or return channels) by multiplexing users of different enterprises on the same set of return channels. The return channel can include multiple carriers, each operating at speeds, for example, of 64 kbps, 128 kbps, or 256 kbps. Each of these carriers is a TDMA (Time Division Multiple Access) stream, which employs several transmission schemes.

The NOC 111 manages and controls communication services and operations. For example, the NOC 111 provisions and identifies the communication channels that are to be allocated. Additionally, the NOC 111 is responsible for controlling the bandwidth that is made available to the STs 103, 105, 107, 109.

Bandwidth on any inroute group (set of inroutes) is available to any terminal that is able to use it. In other words, the STs 103, 105, 107, 109 are totally trusted. The hub 111 does not need to perform the admission control function, or have knowledge of permissible or authorized terminals, as the information, e.g., IQoS ID, is securely loaded into the terminals. This approach provides the advantage that the network of STs 103, 105, 107, 109 can be expanded without any change in the configuration of the return channel equipment within the hub 111.

FIG. 2 is a diagram of an architecture of the hub of FIG. 1 for mapping return channel bandwidth to the satellite terminals, according to an embodiment of the present invention. As shown, the hub 111 of the system 100 includes return channel equipment 201 for interfacing with return channels, as well as outroute channel equipment 203 to transmit signals over an outroute 205 to the terminals associated with IQoS ID A and IQoS ID B. In this example, the outroute 205 is a common channel. By contrast, the terminals utilize different sets of return channels, according to the assigned IQoS ID. Specifically, Enterprise A with IQoS ID A employs a set of m return channels 207, and Enterprise B with IQoS ID B transmits over a set of n return channels 209.

In this example, Enterprise A has n terminals ($T_1, \ldots, T_n$), where each terminal is configured with IQoS ID A. Similarly, Enterprise B has p terminals ($T_1, \ldots, T_p$), each with identifier, IQoS ID B. The hub 111 associates the sets of return channels with the respective identifiers and advertises this mapping via the common outroute 205, using a dedicated outroute messaging protocol. Each set (group) of inroutes is uniquely identified within the system 100 through the identifier.

As previously mentioned, the system 100 can improve utilization of the return channels by multiplexing traffic from terminals associated with different IQoS IDs upon a common set of return channels. This approach thus provides a higher return on investment for the service provider of the system 100 by associating multiple enterprises with the same set of inroutes. Each enterprise is guaranteed a minimum amount of return channel bandwidth and can use more if available (not used by the other parties).

For the purposes of explanation, it is assumed that enterprises 1 and k are sharing the same set of return channels (where k>1); i.e., that of group m. The mapping can be simply represented as a triplet (1, k, m). In an exemplary embodiment, the first two symbols in the triplet represent the start and end of a sorted range of IQoS IDs. Enterprises with IQoS IDs in this range have bandwidth dedicated on inroute group m. Under this scenario, the range is simple, containing only two IQoS IDs. Depending on the amount of bandwidth available on the inroute group and the customer requirements, this range can identify one or more enterprises. Maximum benefits in terms of inroute performance are achieved by identifying enterprises with diverse usage patterns and mapping them to the same set of inroutes.

An enterprise can add more sites and can use the service as soon as the newly installed terminals are correctly configured with the proper IQoS ID. This approach scales up easily because it does not involve any configuration change for the return channel equipment 201 (FIG. 2) of the hub 111.

Figure 3:
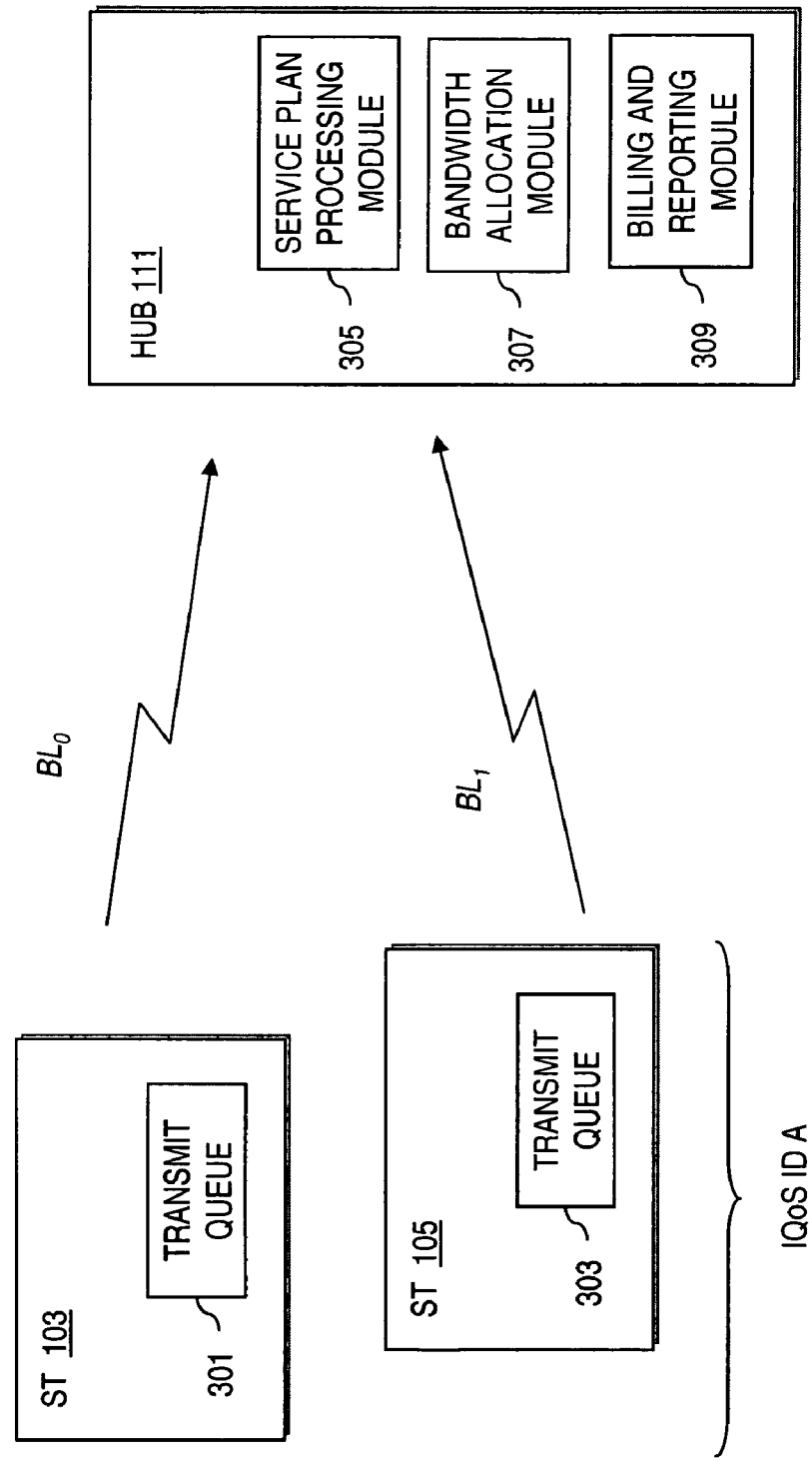
FIG. 3 is a diagram showing the interaction between the terminals associated with a service plan to the hub for conveying backlog information, according to an embodiment of the present invention.

FIG. 3 is a diagram showing the interaction between the terminals associated with a service plan to the hub for conveying backlog information, according to an embodiment of the present invention. For the purposes of explanation, a collection interval is defined as an arbitrary number of contiguous transmission frames, such as TDMA frames, for which the NOC 111 gathers the following parameters: backlogs (or load) and allocated bandwidth. As seen in FIG. 3, the STs 103 and 105 each has a transmit queue 301 and 303, respectively, to queue data for transmission. At any point in time, the amount of data stored in the transmit queue 301 (as represented by $BL_0$), for example, constitutes the backlog or load of the terminal 103. This backlog information is transmitted to the hub 111. Likewise, the load, $BL_1$, of the ST 105 is dictated by the amount of data in the transmit queue 303; the load information, $BL_1$, is supplied by the ST 105 to the hub 111. The dynamic nature of the load can be seen from the example of FIG. 4.

Figure 4:
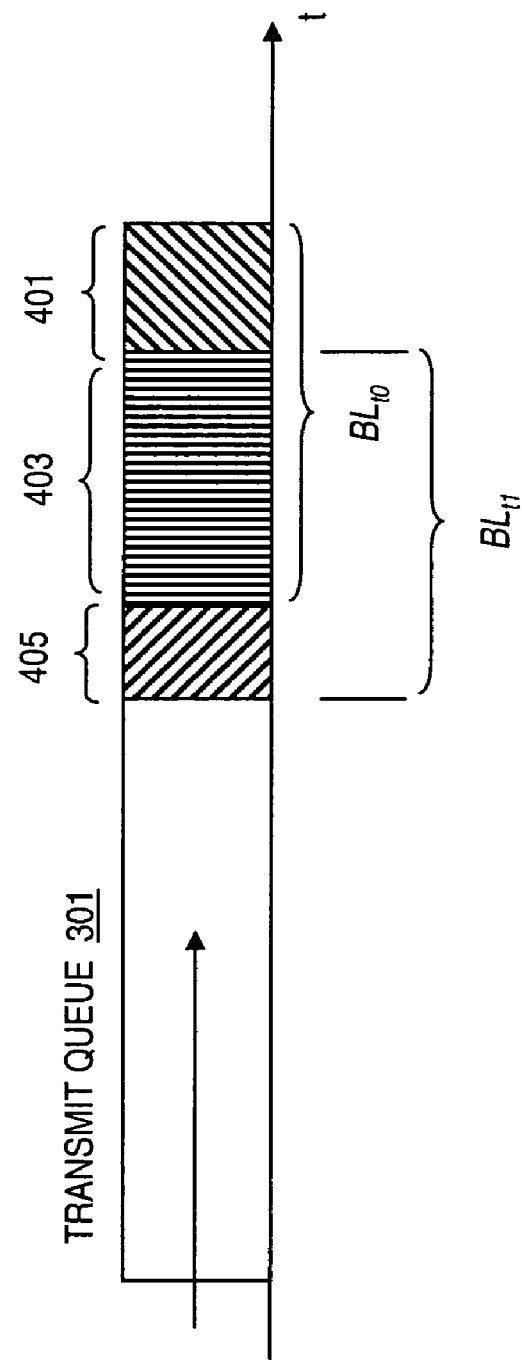
FIG. 4 is a diagram of a transmit queue and the loading information conveyed to the hub, according to an embodiment of the present invention.

FIG. 4 is a diagram of a transmit queue and the loading information conveyed to the hub, according to an embodiment of the present invention. The transmit queue 301 of the ST 103 stores, at time t0, data segments 401 and 403, which collectively are represented by $BL_{t0}$. Next it is assumed that the data segment 401 is serviced. Now, in the next time period, the transmit queue 301 gains a new data segment 405, but retains the old data segment 403. In other words, at time t1, the new data segment 405 is queued, while the data segment 401 has been dequeued and transmitted. Thus, the ST 103 sends the load information, $BL_{t1}$. As evident from the diagram, the protocol does not convey the cumulative load or backlog, which would comprise data segments 401, 403 and 405. Although the ST 103 can be configured to track the cumulative load and subsequently conveying the information to the hub 111, the modification would introduce more complexity in the design of the ST 103, and thus more cost to the subscriber as well as the manufacturer. In practical systems, the deployment of STs 103, 105, 107, 109 can run into the several hundreds of thousands; hence the cost would be greatly magnified given the volume.

Figure 5:
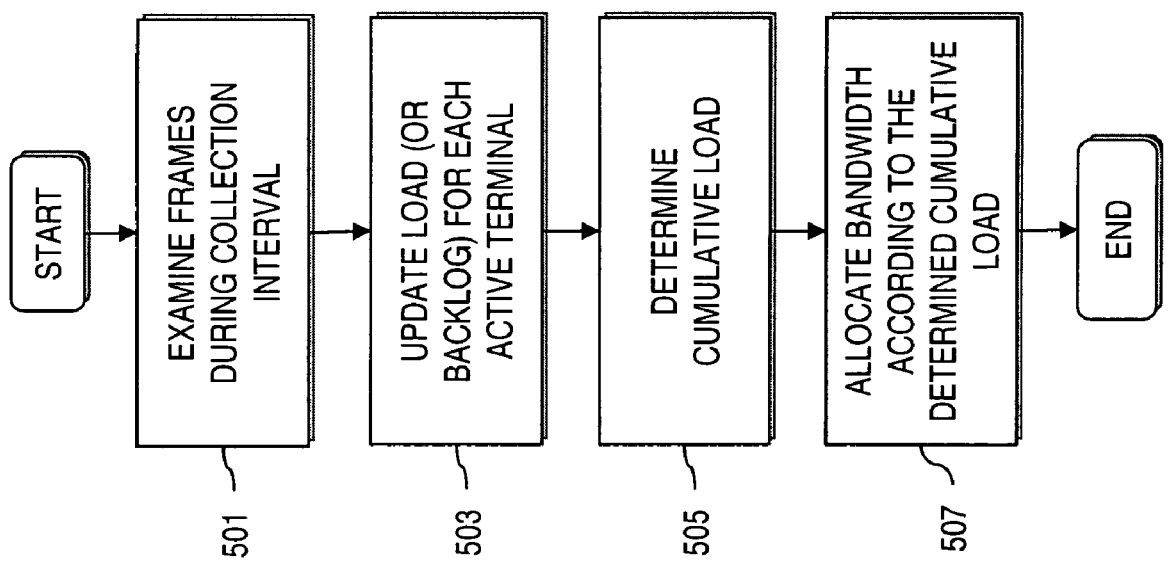
FIG. 5 is a flowchart of a process for using cumulative loading to allocate bandwidth, according to an embodiment of the present invention.

FIG. 5 is a flowchart of a process for using cumulative loading to allocate bandwidth, according to an embodiment of the present invention. In steps 501 and 503, the TDMA frames are collected, wherein the load for each active terminal is updated via the transmissions of the load information. Returning to FIG. 3, the hub 111 includes a Service Plan Processing Module 305, a Bandwidth Allocation Module 307, and a Billing and Reporting Module 309 to process the loading information, $BL_0$ and $BL_1$. Specifically, the Service Plan Processing Module 305 executes actions to match resource utilization with the demand within the constraints of the dedicated return channels. The longer the collection intervals are, the smoother the averaging is and the slower the overall response (on the feedback loop) becomes. The averaging term is used herein in the context of the law of large numbers. The control inputs become bursty when the intervals are short. The bandwidth-backlog matching can be performed through redistribution of the users to the inroutes, thus short collection intervals may lead to unnecessary switches and eventually poor performance. According to an embodiment of the present invention, an active terminal that switches inroutes cannot use bandwidth that could otherwise be allocated for the frame immediately after the switch.

The Bandwidth Allocation Module 307 updates the backlog (amount of data outstanding in transmit queues) for each active user on a frame-by-frame basis. The module 307 maintains a "real" backlog, which is a positive integer quantity derived from the advertised backlog and the amount of allocated bandwidth. The real backlog is calculated by taking the difference between the most recent backlog indication (or its derivation) and the amount of bandwidth that has been allocated to the user since its most recent burst was received in the NOC 111. If the burst does not contain a backlog indication, the NOC 111 derives the raw backlog value using the previous backlog and the size of the current datagram.

A user's cumulative backlog (or load), on the other hand, represents the total amount of data (in bytes) sent on the inroute by a terminal. In step 505, the cumulative load can be determined. The derivation of a formula for the user's cumulative backlog follows the notations of Table 1:

TABLE 1

| PARAMETER | DEFINITION |
|---|---|
| $t_i$ | A burst was received from the remote during this frame |
| $BL_i$ | Raw backlog during frame $t_i$ |
| $BW_i$ | Bandwidth allocated during frame $t_i$ |
| $CBL_i$ | Cumulative backlog. |

At $t_0$, the NOC 111 receives, for example, an ALOHA burst from a terminal (e.g., ST 103). The backlog advertised at this time is $BL_0$. In turn, $CBL_0 = BL_0$ and $BW_0 = 0$. The first stream burst, received during frame $t_1$, over some amount of bandwidth $BW_1$ indicates a backlog $BL_1$. The following equation results:

$$CBL_1 = CBL_0 + |BL_1 - (BL_0 - BW_1)|^+, \qquad \text{Eq. (1)}$$

where, $$|x|^+ = \begin{cases} x & \text{if } x > 0, \\ 0 & \text{if } x \le 0. \end{cases} \qquad \text{Eq. (2)}$$

In other words, the cumulative backlog grows with the amount of new data. In general, the cumulative backlog is given by:

$$CBL_k = CBL_{k-1} + |BL_k - (BL_{k-1} - BW_k)|^+. \quad \text{Eq. (3)}$$

Figure 6:
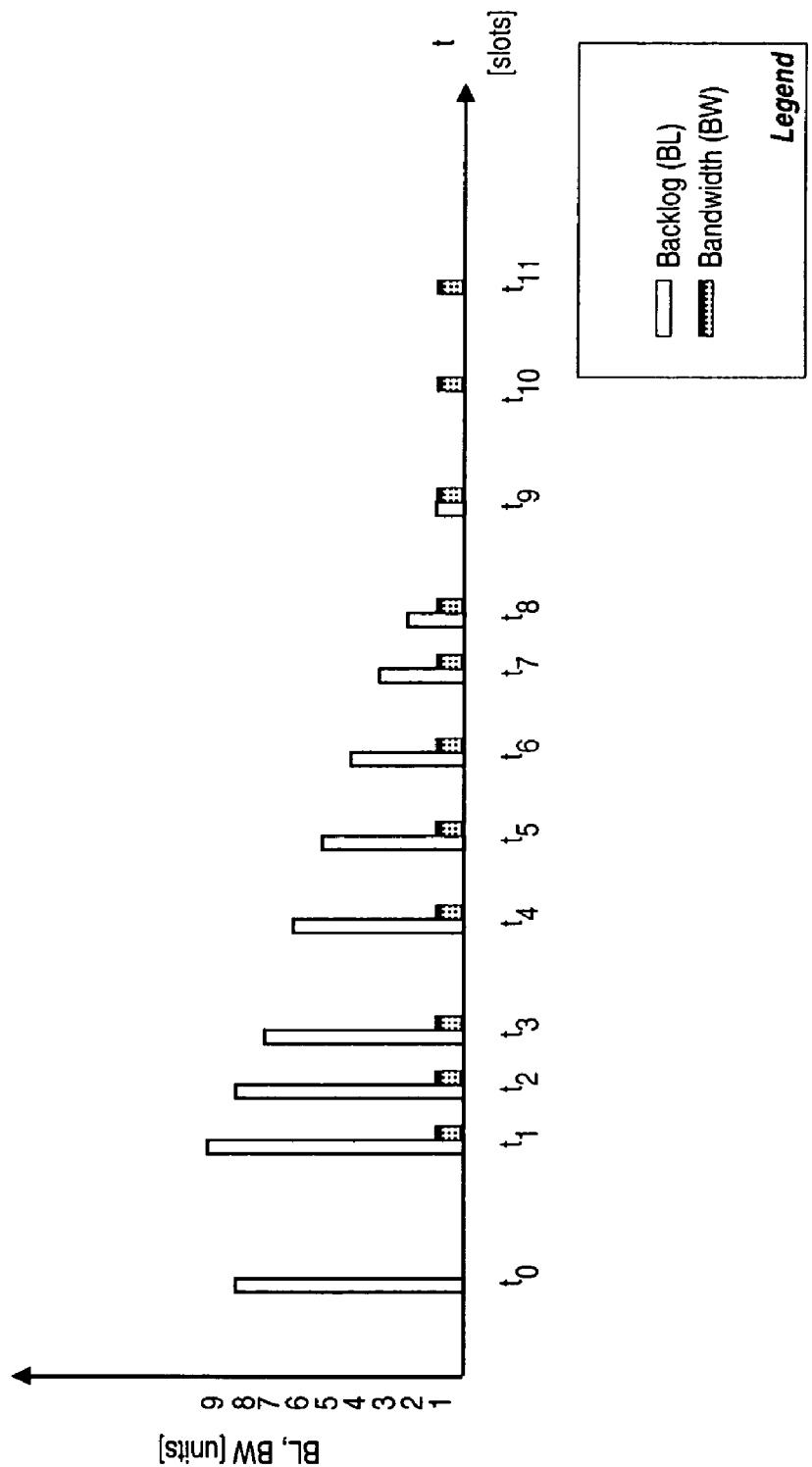
FIG. 6 is a graph showing cumulative load for an active session of a terminal in the system of FIG. 1.

FIG. 6 illustrates the cumulative backlog for an active session of a terminal.

If TCBL represents the total cumulative backlog for this user, then:

$$TCBL = 8 + (9-(8-1)) + (8-(9-1)) + (7-(8-1)) + \ldots + (1-(2-1)) + (0-(1-1)) = 10 \text{ units[Bytes]} \quad \text{Eq. (4)}$$

Also, FIG. 6 shows the collection intervals with two different filling styles. The cumulative backlog at the end of the first interval can be used in bandwidth distribution algorithms for allocating inroute bandwidth during the next interval. In parallel, the cumulative backlog can continue to be updated at a different memory location. In the third interval, this processing cycle restarts.

In step 507, the NOC 111 allocates bandwidth (or capacity) of the return channels according to the determined cumulative load.

Figure 7:
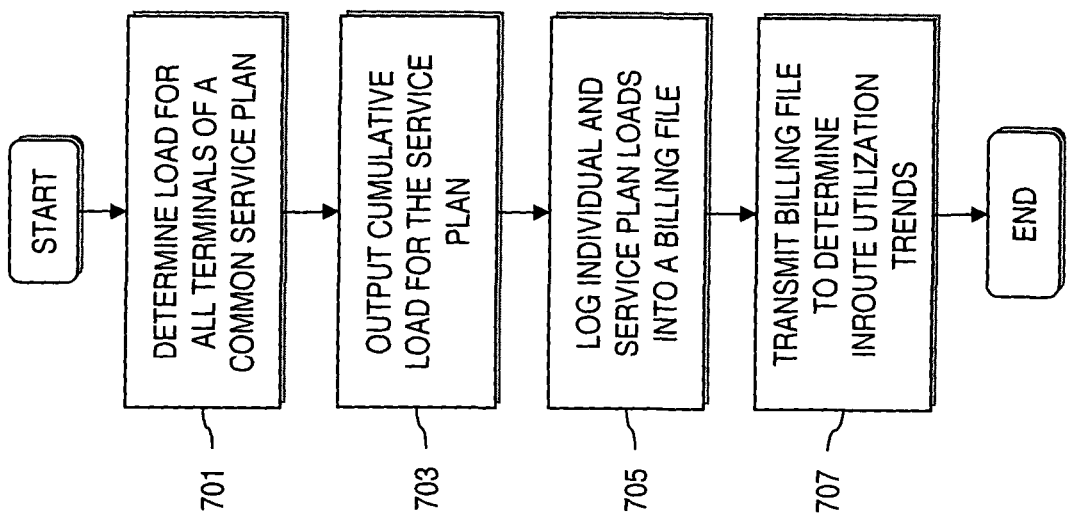
FIG. 7 is a flowchart of a process for determining cumulative load for a service plan, in accordance with an embodiment of the present invention.

FIG. 7 is a flowchart of a process for determining cumulative load for a service plan, in accordance with an embodiment of the present invention. In step 701, the group load for all terminals of a common service plan is determined and output (per step 703). When summing over the entire user population of a service plan (e.g., IQoS ID A), the cumulative backlog for the plan itself can be obtained. In an exemplary embodiment, the user backlog and cumulative backlog are logged, per step 705, in the billing files for offline analysis of the inroute utilization trends (step 707). This billing file is generated by the Billing and Reporting Module 309 (FIG. 3). The main use of this file is to define the demand (load), which is the primary factor in the distribution of inroute group resources (i.e., bandwidth).

The processes described above provide determination of traffic load for the system 100 to improve the inroute allocation process. The processes detailed above can be executed through a variety of hardware and/or software configurations.

Figure 8:
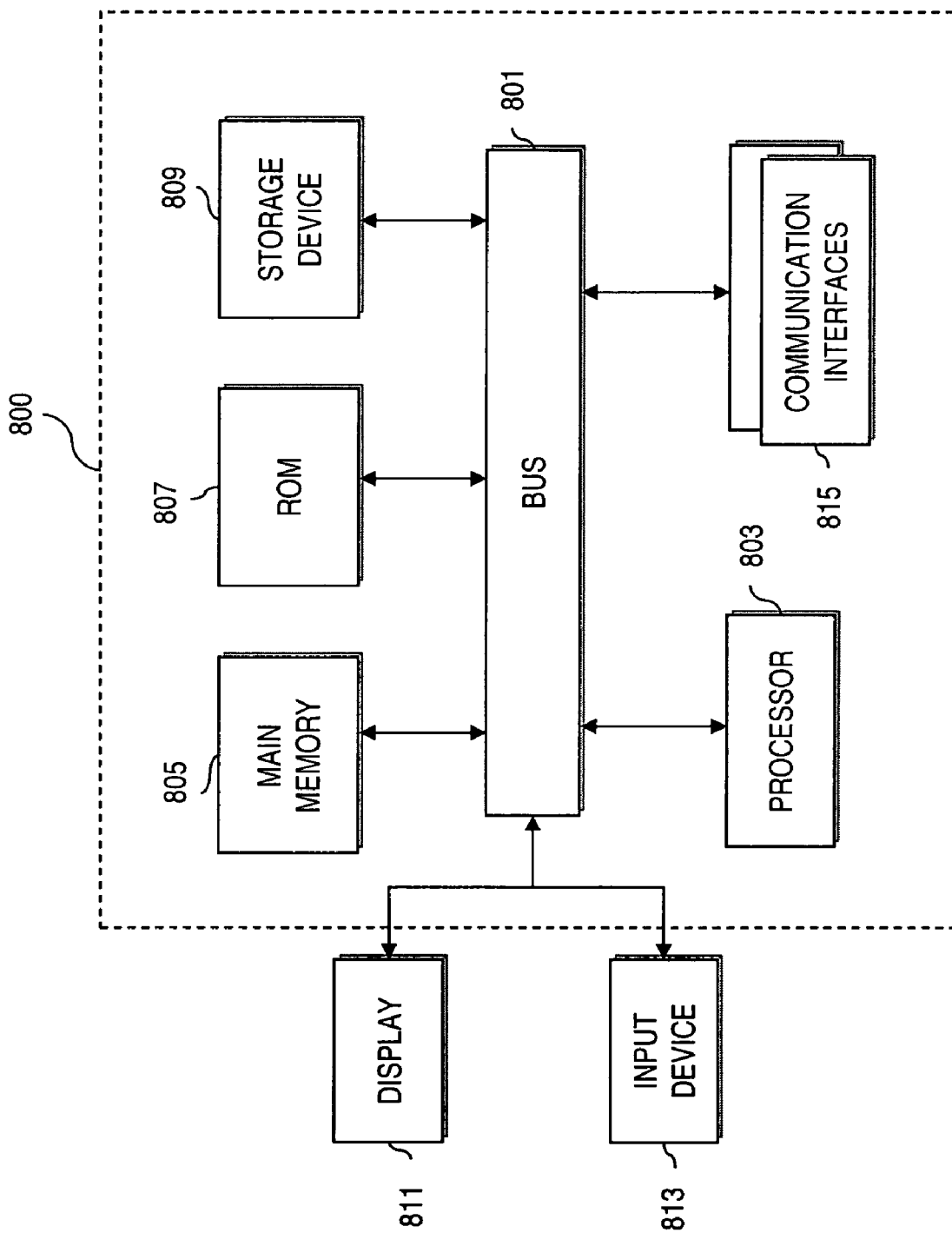
FIG. 8 is a diagram of hardware that can be used to implement an embodiment of the present invention.

FIG. 8 illustrates a computer system 800 upon which an embodiment according to the present invention can be implemented. The computer system 800 includes a bus 801 or other communication mechanism for communicating information, and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions to be executed by the processor 803. The computer system 800 further includes a read only memory (ROM) 807 or other static storage device coupled to the bus 801 for storing static information and instructions for the processor 803. A storage device 809, such as a magnetic disk or optical disk, is additionally coupled to the bus 801 for storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control, such as a mouse, a trackball, or cursor direction keys for communicating direction information and command selections to the processor 803 and for controlling cursor movement on the display 811.

According to one embodiment of the invention, the processes of FIGS. 5 and 7 are provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 815 coupled to bus 801. The communication interface 815 provides a two-way data communication coupling to a network link connected to a local network. For example, the communication interface 815 may be a digital subscriber line (DSL) card or modem, an integrated services digital network (ISDN) card, a cable modem, or a telephone modem to provide a data communication connection to a corresponding type of telephone line. As another example, communication interface 815 may be a local area network (LAN) card (e.g. for Ethernet™. or an Asynchronous Transfer Model (ATM) network) to provide a data communication connection to a compatible LAN. Wireless links can also be implemented. In any such implementation, communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The network link typically provides data communication through one or more networks to other data devices. For example, the network link may provide a connection through local network to a host computer, which has connectivity to a network (e.g. a wide area network (WAN) or the global packet data communication network now commonly referred to as the "Internet") or to data equipment operated by service provider. The local network and network both use electrical, electromagnetic, or optical signals to convey information and instructions. The signals through the various networks and the signals on network link and through communication interface 815, which communicate digital data with computer system 800, are exemplary forms of carrier waves bearing the information and instructions.

The computer system 800 can send messages and receive data, including program code, through the network(s), network link, and communication interface 815. In the Internet example, a server (not shown) might transmit requested code belonging to an application program for implementing an embodiment of the present invention through the network, local network and communication interface 815. The processor 803 may execute the transmitted code while being received and/or store the code in storage device 809, or other non-volatile storage for later execution. In this manner, computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the above approach provides for determining load of a terminal operating in a communication system. A cumulative load for the terminal is determined based on raw load information received from the terminal and bandwidth allocation information. The cumulative load represents a total amount of data sent over a communication channel of the communication system. Under this arrangement, effective bandwidth allocation can be achieved.

While the present invention has been described in connection with a number of embodiments and implementations, the present invention is not so limited but covers various obvious modifications and equivalent arrangements, which fall within the purview of the appended claims.

The invention claimed is:

1. A method for determining load of a terminal operating in a communication system, the method comprising:
   receiving load information from the terminal during a frame transmission, wherein the terminal belongs to a group of terminals having a common service level;
   determining bandwidth allocation information associated with the frame transmission; and
   determining a cumulative load for the terminal based on the load information and the bandwidth allocation information, wherein the cumulative load represents a total amount of data sent over a communication channel of the communication system,
   wherein the cumulative load, $CBL_k$, is determined according to:

$$CBL_k = CBL_{k-1} + |BL_k - (BL_{k-1} - BW_k)|^+,$$

where, $$|x|^+ = \begin{cases} x & \text{if } x > 0, \\ 0 & \text{if } x \leq 0. \end{cases}$$

$BL_k$ is the load information, and $BW_k$ is the bandwidth allocation.

2. A method according to claim 1, further comprising:
   determining a total of cumulative loads for each of the terminals in the group.

3. A method according to claim 1, wherein the communication system is a satellite network, and the communication channel is a return channel.

4. A method according to claim 1, further comprising:
   generating a billing file that includes the determined cumulative load.

5. A computer-readable storage medium encoded with computer executable instructions for providing load balancing in a communication system including a plurality of terminals, the instructions, being arranged, upon execution, to cause one or more processors to perform:
   receiving load information from the terminal during a frame transmission, wherein the terminal belongs to a group of terminals having a common service level;
   determining bandwidth allocation information associated with the frame transmission; and
   determining a cumulative load for the terminal based on the load information and the bandwidth allocation information, wherein the cumulative load represents a total amount of data sent over a communication channel of the communication system,
   wherein the cumulative load, $CBL_k$, is determined according to:

$$CBL_k = CBL_{k-1} + |BL_k - (BL_{k-1} - BW_k)|^+,$$

where, $$|x|^+ = \begin{cases} x & \text{if } x > 0, \\ 0 & \text{if } x \leq 0. \end{cases}$$

$BL_k$ is the load information, and $BW_k$ is the bandwidth allocation.

6. An apparatus for determining load of a terminal operating in a communication system, the apparatus comprising:
   a processing module configured to receive load information from the terminal during a frame transmission, wherein the terminal belongs to a group of terminals having a common service level, the processing module being further configured to determine bandwidth allocation information associated with the frame transmission,
   wherein the processing module is further configured to determine a cumulative load for the terminal based on the load information and the bandwidth allocation information, wherein the cumulative load represents a total amount of data sent over a communication channel of the communication system,
   wherein the cumulative load, $CBL_k$, is determined according to:

$$CBL_k = CBL_{k-1} + |BL_k - (BL_{k-1} - BW_k)|^+,$$

where, $$|x|^+ = \begin{cases} x & \text{if } x > 0, \\ 0 & \text{if } x \leq 0. \end{cases}$$

$BL_k$ is the load information, and $BW_k$ is the bandwidth allocation.

7. An apparatus according to claim 6, wherein the processing module is further configured to determine a total of cumulative loads for each of the terminals in the group.

8. An apparatus according to claim 6, wherein the communication system is a satellite network.

9. An apparatus according to claim 6, further comprising:
a billing module configured to generate a billing file that includes the determined cumulative load.

10. A method for obtaining load of a terminal operating in a communication system, the method comprising:
transmitting a query for a cumulative load of the terminal, wherein the terminal belongs to a group of terminals having a common service level; and
determining a cumulative load for the terminal based on load information supplied by the terminal and bandwidth allocation information, wherein the cumulative load represents a total amount of data sent over a communication channel of the communication system; and
providing the determined cumulative load in response to the query,
wherein the cumulative load, $CBL_k$, is determined according to:

$$CBL_k = CBL_{k-1} + |BL_k - (BL_{k-1} - BW_k)|^+,$$

where, $$|x|^+ = \begin{cases} x & \text{if } x > 0, \\ 0 & \text{if } x \leq 0. \end{cases}$$

$BL_k$ is the load information, and $BW_k$ is the bandwidth allocation.

11. A method according to claim 10, further comprising:
determining a total of cumulative loads for each of the terminals in the group.

12. A method according to claim 10, wherein the communication system is a satellite network, and the communication channel is a return channel.

13. A method according to claim 10, further comprising:
generating a billing file that includes the determined cumulative load.

14. A computer-readable storage medium encoded with computer executable instructions for providing load balancing in a communication system including a plurality of terminals, the instructions, being arranged, upon execution, to cause one or more processors to perform:
transmitting a query for a cumulative load of the terminal, wherein the terminal belongs to a group of terminals having a common service level; and
determining a cumulative load for the terminal based on load information supplied by the terminal and bandwidth allocation information, wherein the cumulative load represents a total amount of data sent over a communication channel of the communication system; and
providing the determined cumulative load in response to the query,
wherein the cumulative load, $CBL_k$, is determined according to:

$$CBL_k = CBL_{k-1} + |BL_k - (BL_{k-1} - BW_k)|^+,$$

where, $$|x|^+ = \begin{cases} x & \text{if } x > 0, \\ 0 & \text{if } x \leq 0. \end{cases}$$

$BL_k$ is the load information, and $BW_k$ is the bandwidth allocation.

* * * * *